US008764059B2

(12) United States Patent  (10) Patent No.: US 8,764,059 B2
Borghi  (45) Date of Patent: Jul. 1, 2014

(54) SELF-MOVING OPERATING MACHINE WITH INTEGRATED LATERAL MOVEMENT AND LEVELING DEVICE

(75) Inventor: Giovanni Borghi, Modena (IT)

(73) Assignee: C.M.C.S.R.L.—Societa Unipersonale, Modena (IT)

( * ) Notice: Subject to any disclaimer, the term of this patent is extended or adjusted under 35 U.S.C. 154(b) by 0 days.

(21) Appl. No.: 13/576,328

(22) PCT Filed: Feb. 11, 2011

(86) PCT No.: PCT/IB2011/000261
§ 371 (c)(1),
(2), (4) Date: Jul. 31, 2012

(87) PCT Pub. No.: WO2011/110906
PCT Pub. Date: Sep. 15, 2011

(65) Prior Publication Data
US 2012/0321422 A1  Dec. 20, 2012

(30) Foreign Application Priority Data
Mar. 10, 2010  (IT) .................................. MO10A0061

(51) Int. Cl.
*B62D 49/08*  (2006.01)
(52) U.S. Cl.
USPC .......................... 280/755; 280/763.1; 180/900
(58) Field of Classification Search
USPC ............... 280/6.154, 763.1, 755, 43; 180/900
See application file for complete search history.

(56) References Cited

U.S. PATENT DOCUMENTS

| | | | | |
|---|---|---|---|---|
| 3,687,227 A * | 8/1972 | Reuter et al. | ..................... | 180/41 |
| 3,937,339 A * | 2/1976 | Geis et al. | ..................... | 414/697 |
| 3,976,302 A * | 8/1976 | Hammarstrand | .......... | 280/6.154 |
| 4,082,197 A * | 4/1978 | Stedman | ....................... | 414/687 |
| 4,135,597 A * | 1/1979 | Barth | ............................. | 180/420 |
| RE30,021 E * | 6/1979 | Olson et al. | ................... | 414/547 |
| 4,290,622 A * | 9/1981 | Horvath | ........................ | 280/400 |
| 4,381,900 A | 5/1983 | Schlottman | | |
| 4,512,589 A * | 4/1985 | Ambrose et al. | ........... | 280/5.502 |
| 4,580,797 A * | 4/1986 | Ericsson | .................... | 280/5.508 |
| 4,669,566 A * | 6/1987 | Bergius et al. | ................ | 180/420 |
| 5,180,028 A * | 1/1993 | Perrenoud, Jr. | ............... | 180/235 |
| 5,813,697 A * | 9/1998 | Bargenquast et al. | ........ | 280/754 |

(Continued)

FOREIGN PATENT DOCUMENTS

DE 100 17 358 A1 10/2001
EP 0 808 755 A1 11/1997

(Continued)

*Primary Examiner* — Nicole Verley
(74) *Attorney, Agent, or Firm* — Arent Fox LLP

(57) ABSTRACT

A self-moving operating machine with an integrated lateral movement and leveling device, including a chassis having a front part and a rear part, to which a fore axle and a rear axle, both provided with wheels, are constrained, respectively, and including an operating arm having one of its ends constrained to the rear part. The front part and the rear part are articulated to each other by a spherical coupling including two linear actuators, consisting of hydraulic cylinders aimed at operating in mostly vertical directions. A third actuator is rod-wise connected to the front and rear parts, and is aimed at operating according to mostly horizontal directions. The actuators are operated independently. There are provided means designed to measure loads weighing on at least one of the two wheels and to control locking of the rear axle to the rear part upon reaching predetermined limits.

12 Claims, 4 Drawing Sheets

(56) References Cited

U.S. PATENT DOCUMENTS

| | | | |
|---|---|---|---|
| 6,131,918 A * | 10/2000 | Chino | 280/6.154 |
| 6,209,913 B1 * | 4/2001 | Ishikawa et al. | 280/755 |
| 6,227,569 B1 * | 5/2001 | Dingeldein et al. | 280/764.1 |
| 6,293,579 B1 * | 9/2001 | Schaeff | 280/638 |
| 6,331,010 B1 * | 12/2001 | Chino et al. | 280/124.112 |
| 6,460,643 B1 * | 10/2002 | Degelman | 180/89.12 |
| 6,554,558 B2 * | 4/2003 | Knight | 414/685 |
| 6,802,687 B2 * | 10/2004 | Litchfield et al. | 414/699 |
| RE39,477 E * | 1/2007 | Nellers et al. | 280/754 |
| 7,726,665 B2 * | 6/2010 | Bitter | 280/5.502 |
| 8,006,796 B1 * | 8/2011 | Fontaine | 180/235 |

FOREIGN PATENT DOCUMENTS

| | | |
|---|---|---|
| EP | 0 927 698 B1 | 7/1999 |
| GB | 2 121 363 A | 12/1983 |
| WO | WO 85/01702 A1 | 4/1985 |

\* cited by examiner

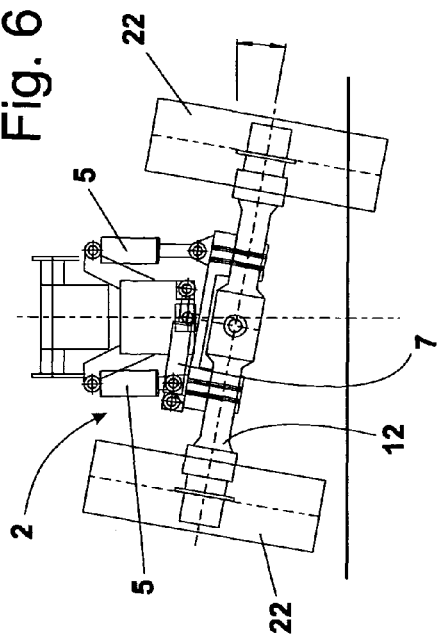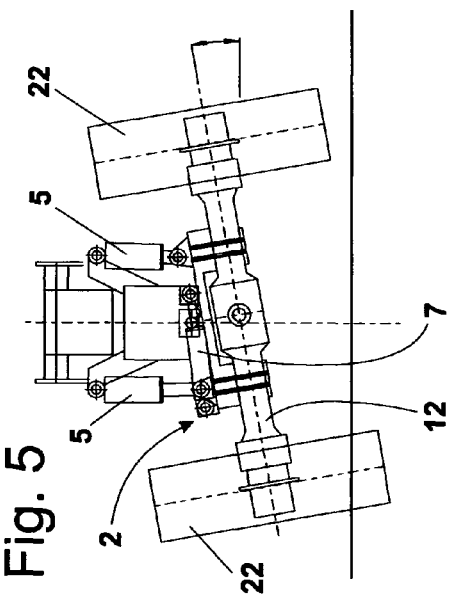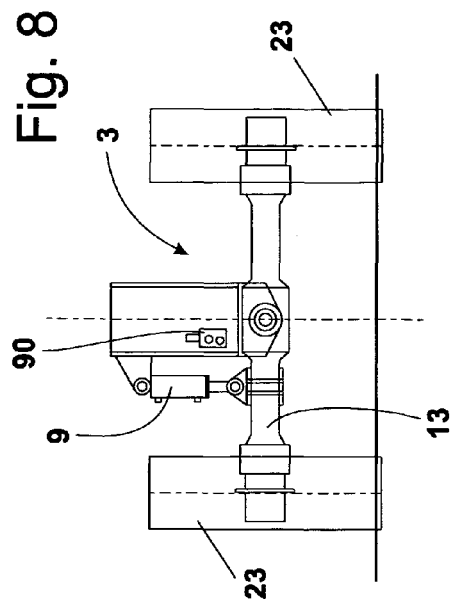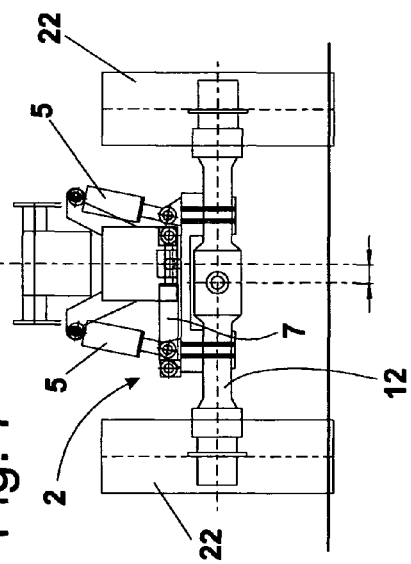

SELF-MOVING OPERATING MACHINE WITH INTEGRATED LATERAL MOVEMENT AND LEVELING DEVICE

CROSS-REFERENCE TO RELATED APPLICATION

This Application is a National Stage entry of International Application No. PCT/IB2011/000261, having an international filing date of Feb. 11, 2011; which claims priority to Italian Application No.: MO2010A000061, filed Mar. 10, 2010; the disclosure of each of which is hereby incorporated in its entirety by reference.

The invention fits in the technical field concerning self-moving operating machines.

Among these, those machines are considered which involve the construction of an integrated vehicle, suitably designed to carry a piece of equipment, such as a tilt lifter arm, equipped with a tool, for instance provided with a fork, with which loads can be raised and transported in construction sites and the like.

For these machines particularly important problems exist, which concern possible tilting, or lateral movement and leveling.

These machines include stabilizer legs, provided only at the front side thereof, designed to lift off the ground the corresponding wheels when, with the vehicle stopped, the machine is prepared for use of the lifter arm.

At the back side, however, the ground support is provided by the wheels.

When the machine is set in place, upon operation of the front stabilizer legs, the lifter arm is allowed to tilt in a vertical plane, to extend its telescopic elements, but not to move in a horizontal plane, that is to traverse sidewise to move into the correct position for carrying out loading and unloading operations.

This results in an operation limit while maneuvering the load, which may require a new placement or positioning of the machine, with consequent waste of the time required to achieve an adequate replacement.

A situation far from uncommon occurs when the ground on which the operating machine rests is sloping with respect to the horizontal, or irregular, so the rear and front wheels, and therefore the above-mentioned stabilizer legs when set in operation, rest on portions of soil with different inclinations.

The inclined and/or unbalanced arrangement of the machine that this implies, of course, becomes more unstable when using the lifter arm, with potential risk for accidents. Suitable maneuvering operations are necessary to achieve an acceptable leveling in horizontal position.

It is therefore an object of the present invention to propose a self-moving operating machine with a lateral shift and leveling integrated device, which is so shaped as to allow a correction of the lateral position of the load, within a predetermined range, in order to optimize the operations of placing the latter without a new placement of the machine.

Another object of the invention relates to the fact of getting an operating machine that can adapt to sloping and/or irregular land to find, in self-sufficient way, a horizontal acceptable arrangement, without external artifacts.

A further important object of the present invention is to respond to a need for security, unresolved in the known applications, which is to prevent, automatically, both side and rear turning over of the machine.

One more object of the invention is to propose an operating machine that maintains a compact size to ensure high maneuverability in tight spaces, with production costs proportionated to the user to whom it is addressed.

Said objects and benefits are achieved by the invention as is apparent from the claims.

In particular, the invention has the characteristic advantageous features to achieve the objects as set out without additional mechanisms, other than those used for leveling and traverse motion.

The features of the invention will be apparent from the following description of preferred embodiments of the stabilizer device in question, in accordance with the contents of the claims and with the help of the attached drawings, in which:

FIGS. 5, 6 and 7 show schematic front views of different operating configurations of the machine, with some parts of this not represented to better emphasize others;

FIG. 8 shows a schematic front view of the machine back side area.

Figure 1:
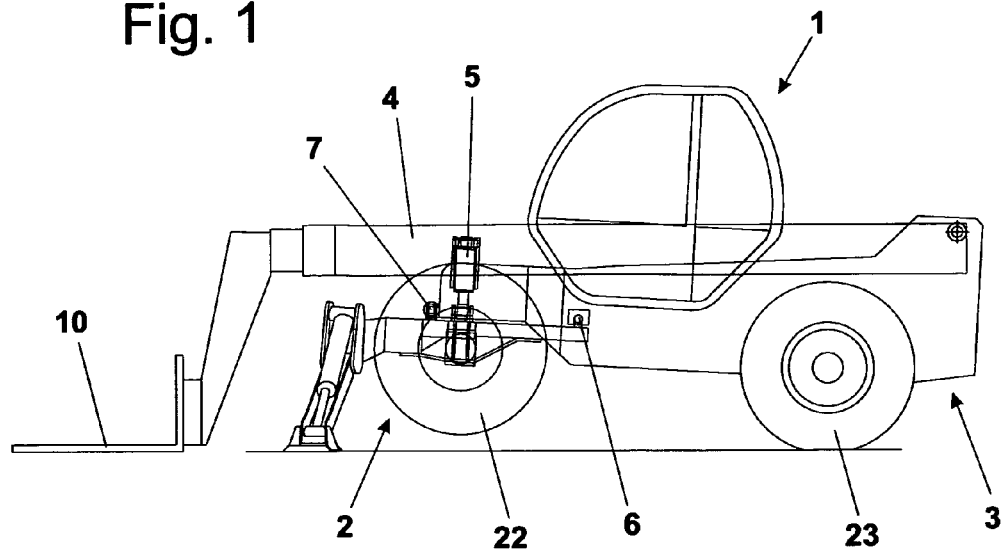
FIG. 1 shows a schematic side view of an operating machine in loading/unloading working position with the front stabilizer elements 8 lowered.
Figure 2:
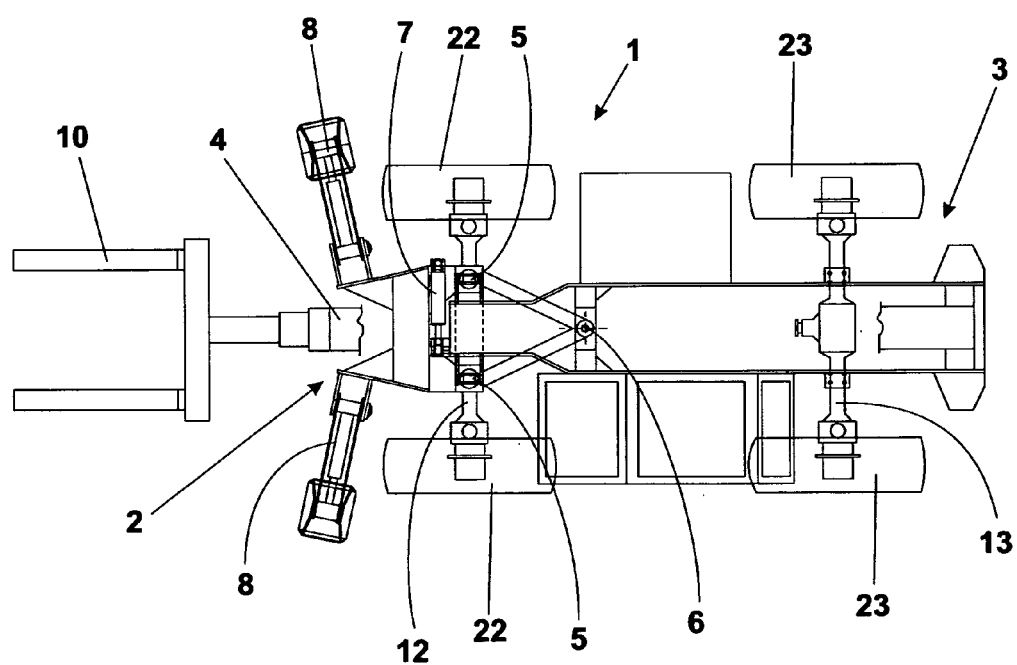
FIG. 2 shows a plan view of FIG. 1.
Figure 3:
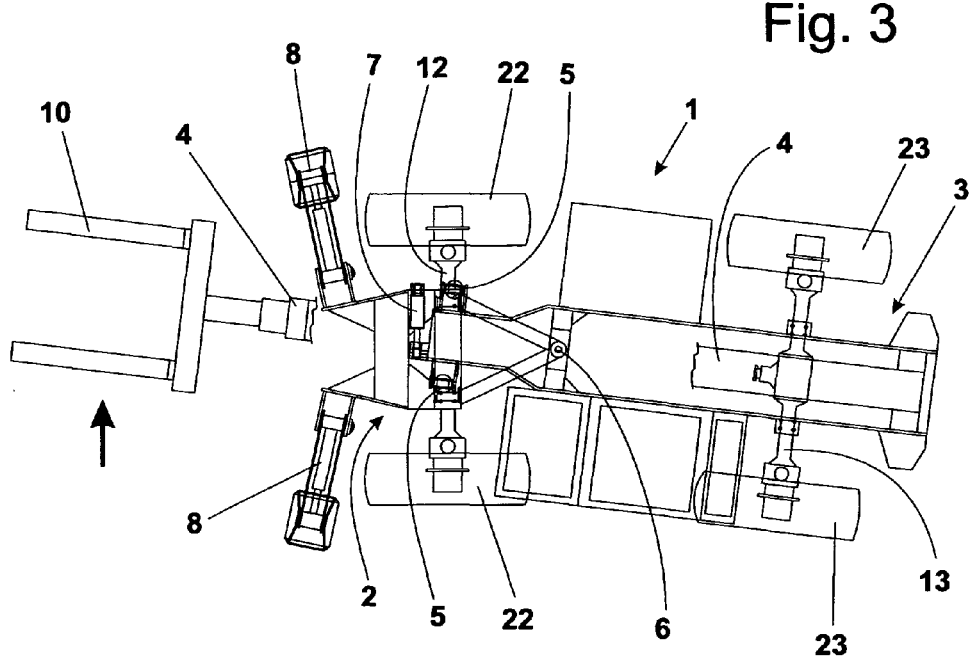
FIGS. 3 and 4 show plan views as those of FIG. 1 in two different operating configurations, in which traverse shifts to the right and the left are highlighted respectively.
Figure 4:
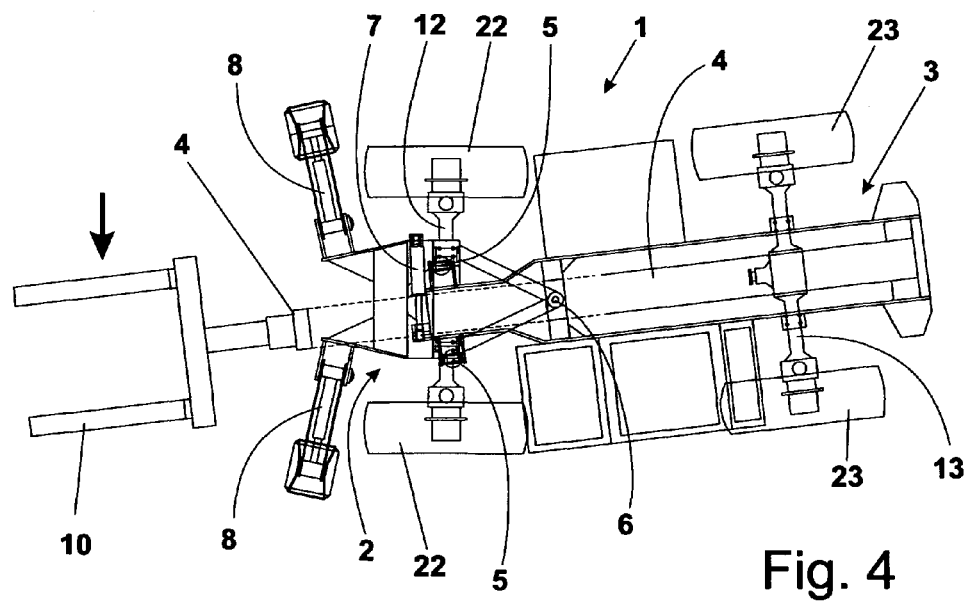

With reference to the above mentioned Figures, numeral 1 generally indicates a self-moving operating machine, which bears an integrated device for lateral movement and leveling. The operating machine 1 includes a frame, in which a front part 2 and a rear part 3 can be identified, to which a fore axle 12 and a rear axle 13 are fitted respectively.

A telescopic operating arm (or lifter arm) 4 is bound (pivoted), with its own ends, to the rear part 3, so as to be movable in a vertical plane of the latter.

The other end of the telescopic operating arm 4 is free and is designed to carry a tool 10, in the illustrated case a fork, which can be coupled and uncoupled therefrom with a suitable coupling system.

The front part 2 and the rear part 3 are articulated to each other by means of a coupling that allows reciprocal movements of the two parts about at least one articulation axis.

In this case the coupling is a spherical coupling 6.

The front part 2 is constrained also to the rear part 3 through a four-arm linkage mechanism, in which the two opposite members, formed jointly in the front part 2 and the rear part 3, are linked to each other via two actuators. Each of these two actuators is rod-wise connected, with one or its ends, to the front part 2 and, with the other end, to the rear part 3.

The actuators are designed to operate in mostly vertical directions. In the configuration, in which the front part 2 is aligned with the rear part 3, the two actuators are arranged symmetrically with respect to a longitudinal mid-plane of the operating machine 1.

At least one third actuator is provided, with one of its ends rod-wise connected to the front part 2 and, with the other end, to the rear part 3, and placed crosswise to the longitudinal axis of the front part 2 of the operating machine 1, so as to operate according to mostly horizontal directions. Preferably, this actuator is arranged in a plane perpendicular to the longitudinal axis of the front part 2 and is substantially horizontal.

All the said actuators are preferably operated independently one from another. More specifically, the two actuators of said four-arm linkage, each of which is rod-wise connected; with one of its ends to the front part 2 and, with the other end, to the rear part 3, are two linear actuators 5, as well as said third actuator is a linear actuator 7.

In the illustrated embodiment, the two linear actuators 5 are hydraulic cylinders and have their lower ends hinged to the front part 2 and placed on the same vertical plane parallel to the geometrical axis of the fore axle 12; the corresponding upper ends are hinged to the rear part 3 and are arranged on the same plane parallel to the geometrical axis of the rear axle 13.

The fore axle 12, carrying wheels 22, is rigidly constrained to the front part 2, to which at least two outer stabiliser elements 8 are also connected, symmetrically with respect to a mid-plane perpendicular to the geometrical axis of the fore axle 12. The latter are controlled independently to ensure stable ground support, when the operating machine is positioned for object loading/unloading operations by the tool mounted to the free end of the telescopic operating arm 4.

The rear axle 13, carrying the wheels 23, is connected to the rear part 3 by means of a traditional suspension. There is also provided at least one stabiliser device that operates, in response to control commands, between the rear axle 13 and the rear part 3. Once operated, this stabilizer device is intended to lock any reciprocal movement between the rear part 3 and the rear axle 13 in any position, and consists of a hydraulic linear actuator or hydraulic cylinder 9, which is hinged, at one of its ends, to a point of the rear axle 13, and with the other end, to a point of the rear part 3. These two hinging points are not contained in the same longitudinal mid-plane of the rear part 3.

The wheels 22, 23, associated to said axles, front 12 and rear 13, respectively, are preferably all driving wheels.

As it is easily deducible from the figures, the presence of the spherical coupling 6 and the articulation between the front part 2 and rear part 3 by means of the pair of linear actuators 5 and the linear actuator 7, in the shown embodiment all being hydraulic cylinders, allows the positioning of the tool of the operating machine 1 to be adjusted through lateral shift and leveling operations. Such adjustments are obtained with modifications of the operating machine configuration, which are caused thereto and controlled by the operation of said actuators, which are controlled in a hydraulic and independent way.

This allows the advantage of adjusting the lateral positioning, within a prefixed range, without the necessity to place again the machine.

Furthermore, it is possible, still without the necessity to place again the machine, to adapt it to sloping and/or irregular grounds, so that the machine recovers an acceptable horizontal arrangement in an autonomous way.

The automatic prevention of the risk of operating machine overturning, both in lateral and rear direction, which corresponds to a very real need of handling safety, is obtained by means destined to measure loads weighing on at least one of the two front wheels (22) and to control, by a control unit, according to reaching predetermined limits, to lock said rear axle (13) with respect to the relative rear part (3).

These means include pressure transducers, associated to the two linear actuators (5), which consist of hydraulic cylinders, as it has already been said. Said pressure transducers, not shown in detail, are associated to the chambers of each cylinder, so as to measure the pressures present thereinside, which result to be directly proportional to the loads weighing on the respective wheels (22).

The transducers are connected to an electronic control and data processing unit (likewise not shown) that makes the algebraic sum of the pressures measured in the chambers to determine the load weighing on a wheel 22 and/or on the fore axle 12. In case such loads are reduced beyond the prefixed limits, the same electronic unit sends a signal that operates the electromagnetic valve 90, so as to lock the cylinder 9 and consequently, the rear axle 13 to the rear part 3.

Figure 9:
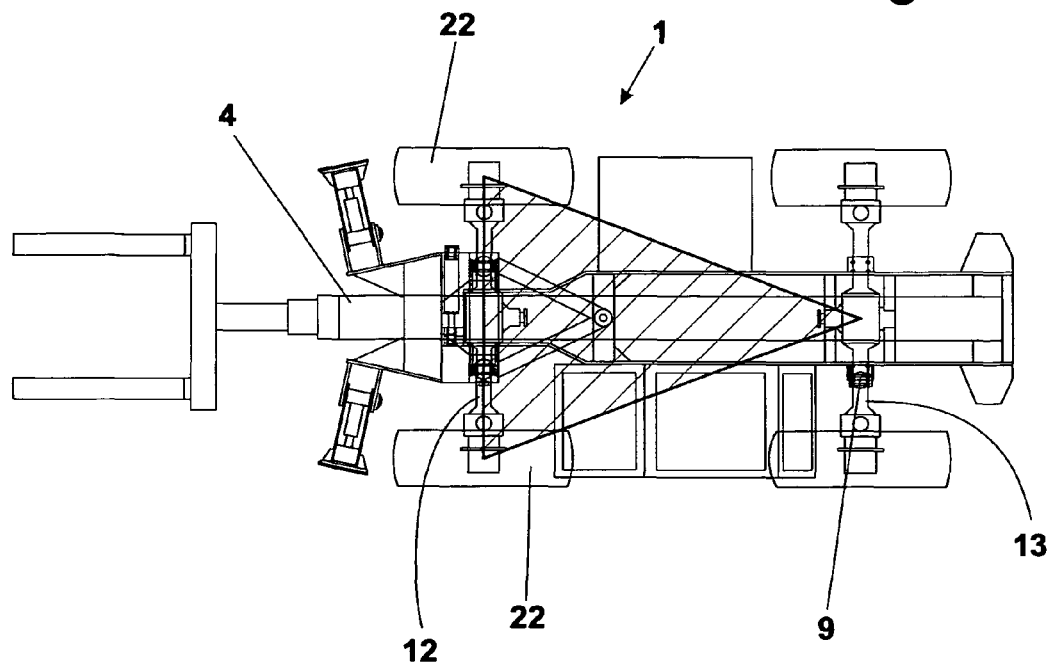
FIGS. 9 and 10 show schematic plan views of the machine, with the resting base marked in two different operating configurations.
Figure 10:
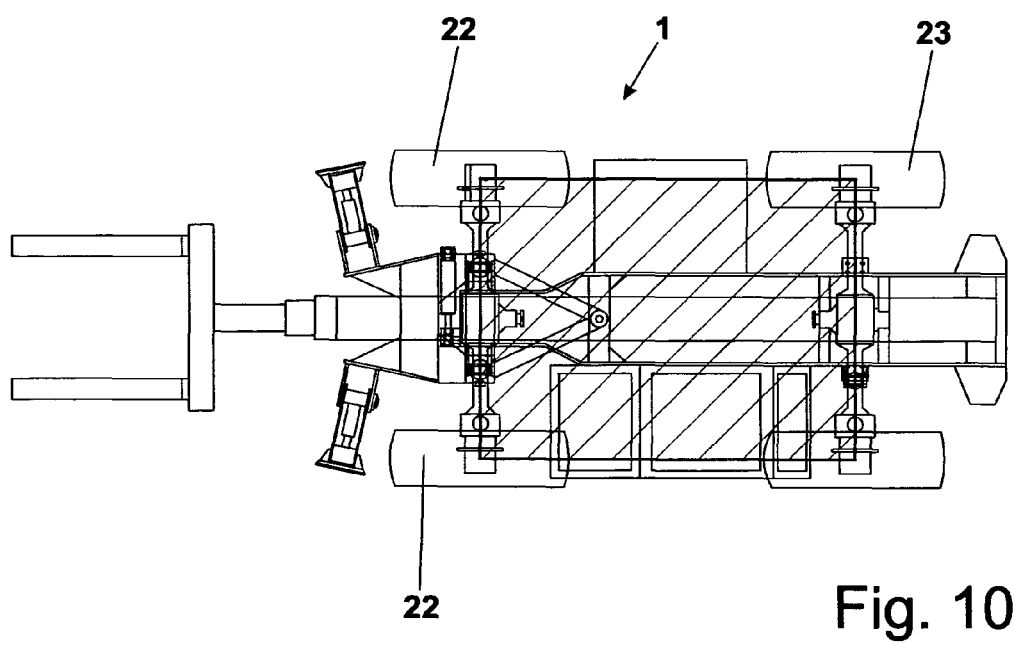

In this way, the resting base is extended considerably, passing from a triangular shape (FIG. 9) to a rectangular one (FIG. 10), which is obviously more effective in preventing the operating machine from lateral-rear overturning.

The invention claimed is:

1. A self-moving operating machine with integrated lateral movement and leveling device, including:
    a chassis having a front part and a rear part to which a fore axle, provided with a pair of wheels, and a rear axle, provided of a pair of wheels, are constrained, respectively;
    an operating arm having a related end constrained to the rear part, such as to be movable in a vertical plane of the latter; another end of the operating arm being free and designed to carry a tool, characterised in that:
    the front part and the rear part are articulated to each other by a coupling that allows relative movements about at least one articulation axis; said front part also being constrained to said rear part through a deformable four-arm linkage, in which two opposite members, formed jointly by the front part and the rear part, are linked to each other via two actuators, each of which is connected, connecting rod-wise, with a related end to the front part and, with the other end, to the rear part; said actuators being designed to operate in mostly vertical directions; at least a third actuator being provided which is connected, connecting rod-wise, with a related end to the front part and, with the other end, to the rear part and which is designed to operate according to mostly horizontal directions; said actuators being independently operable; means being provided which are designed to measure loads weighing on at least one of the two wheels of the above mentioned fore axle and to impart a locking command in response to predetermined limits being achieved, to lock said rear axle with respect to the related rear part.

2. A machine according to claim 1, characterised in that said front part and said rear part are articulated to each other by means of a spherical coupling.

3. A machine according to claim 1, characterised in that the two actuators of the four-arm linkage, each of which is connected, connecting rod-wise with a related end to the front part and, with the other end, to the rear part, are two linear actuators.

4. A machine according to claim 1, characterised in that said third actuator, which is connected, connecting rod-wise, with a related end to the front part and, with the other end, to the rear part and which is designed to operate according to mostly horizontal directions, is a linear actuator.

5. A machine according to claim 1, characterised in that said fore axle is rigidly connected to said front part to which at least two outer stabiliser elements are also connected, symmetrically with respect to a mid-plane perpendicular to the fore axle geometrical axis; said at least two outer stabiliser elements being independently controlled to ensure ground support.

6. A machine according to claim 1, characterised in that said rear axle is connected to the rear part by a suspension; that in said means designed to measure loads weighing on at least one of the two wheels of the above mentioned fore axle and to impart a locking command to look said rear axle with respect to the related rear part, at least a stabiliser device is provided which operates, in response to control commands, between said rear axle and said rear part to lock any reciprocal movement thereof in any predetermined position.

7. A machine according to claim 6, characterised in that said at least one stabiliser device operating, in response to control commands, between said rear axle and said rear part to lock any reciprocal movement thereof, includes a linear hydraulic actuator or hydraulic cylinder hinged, with a related end, at a position on the rear axle and with the other end, at a position of the rear part.

8. A machine according to claim 3, characterised in that said two linear actuators are hydraulic cylinders and have their corresponding ends, hinged to the front part, arranged on a same vertical plane parallel to the fore axle geometrical axis, and their corresponding ends, hinged to the rear part, arranged on a same plane parallel to the rear axle geometrical axis.

9. A machine according to claim 8, characterised in that said means designed to measure loads weighing on at least one of the two wheels of the above mentioned fore axle include pressure transducers associated to the two linear actuator being hydraulic cylinders.

10. A machine according to claim 9, characterised in that said pressure transducers are associated to said linear actuator constituted by hydraulic cylinders so that they measure the pressures present thereinside, which result to be directly proportional to the loads weighing on the respective wheels of the said fore axle.

11. A machine according to claim 10, characterised in that said means include a control unit designed to impart a locking command, in response to predetermined limits being achieved, to lock said rear axle with respect to the related rear part, and also designed to receive measure signals from said transducers, and to compare them with predetermined limits and to impart a locking command, in response to such limits being achieved, to lock the rear axle suspension with respect to the rear part through a command to operate said linear actuator which is a double-acting hydraulic cylinder.

12. A machine according to claim 11, characterised in that the machine comprises at least a third linear hydraulic actuator, said third linear hydraulic actuator being a double-acting hydraulic cylinder and being independently operable.

\* \* \* \* \*